Dec. 11, 1934.   J. L. ADAMS   1,983,726
ANTIBACKING ATTACHMENT FOR MOTOR VEHICLES
Filed Dec. 8, 1930   3 Sheets-Sheet 3
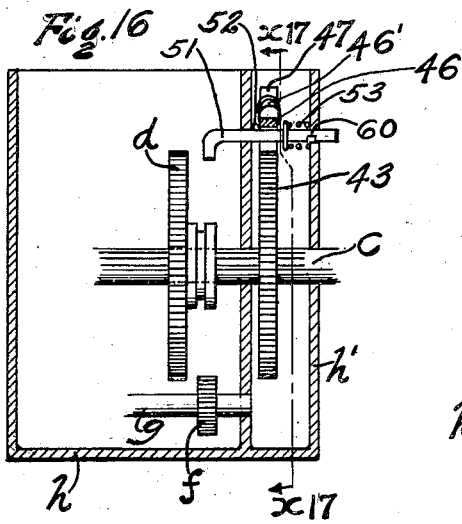
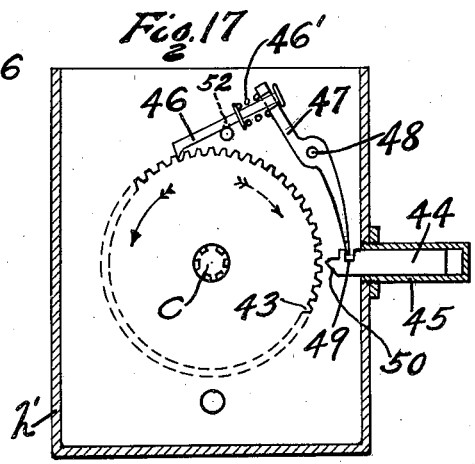
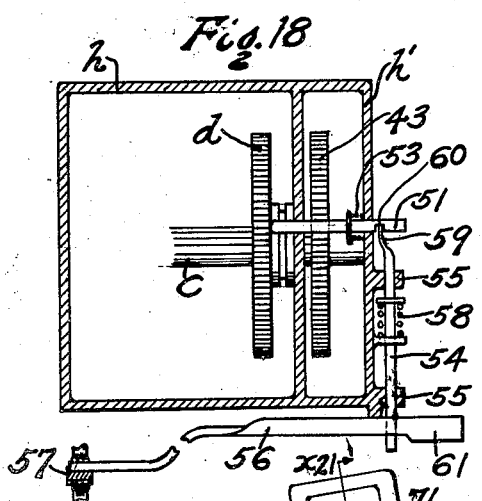
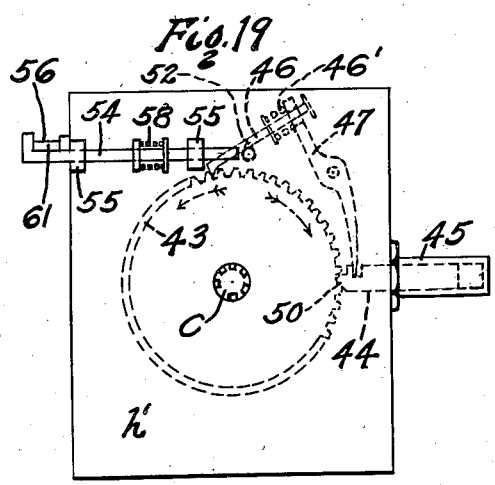
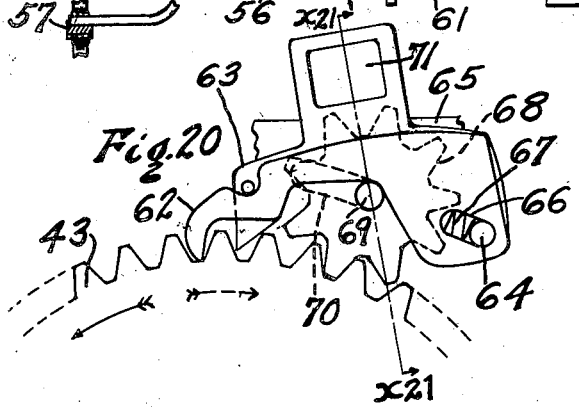
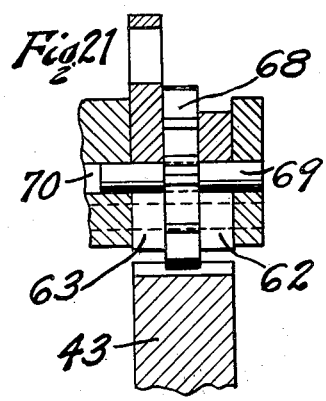
INVENTOR
JOHN L. ADAMS
by James R. Townsend
his atty
WITNESS:
John A. McDowell Patented Dec. 11, 1934

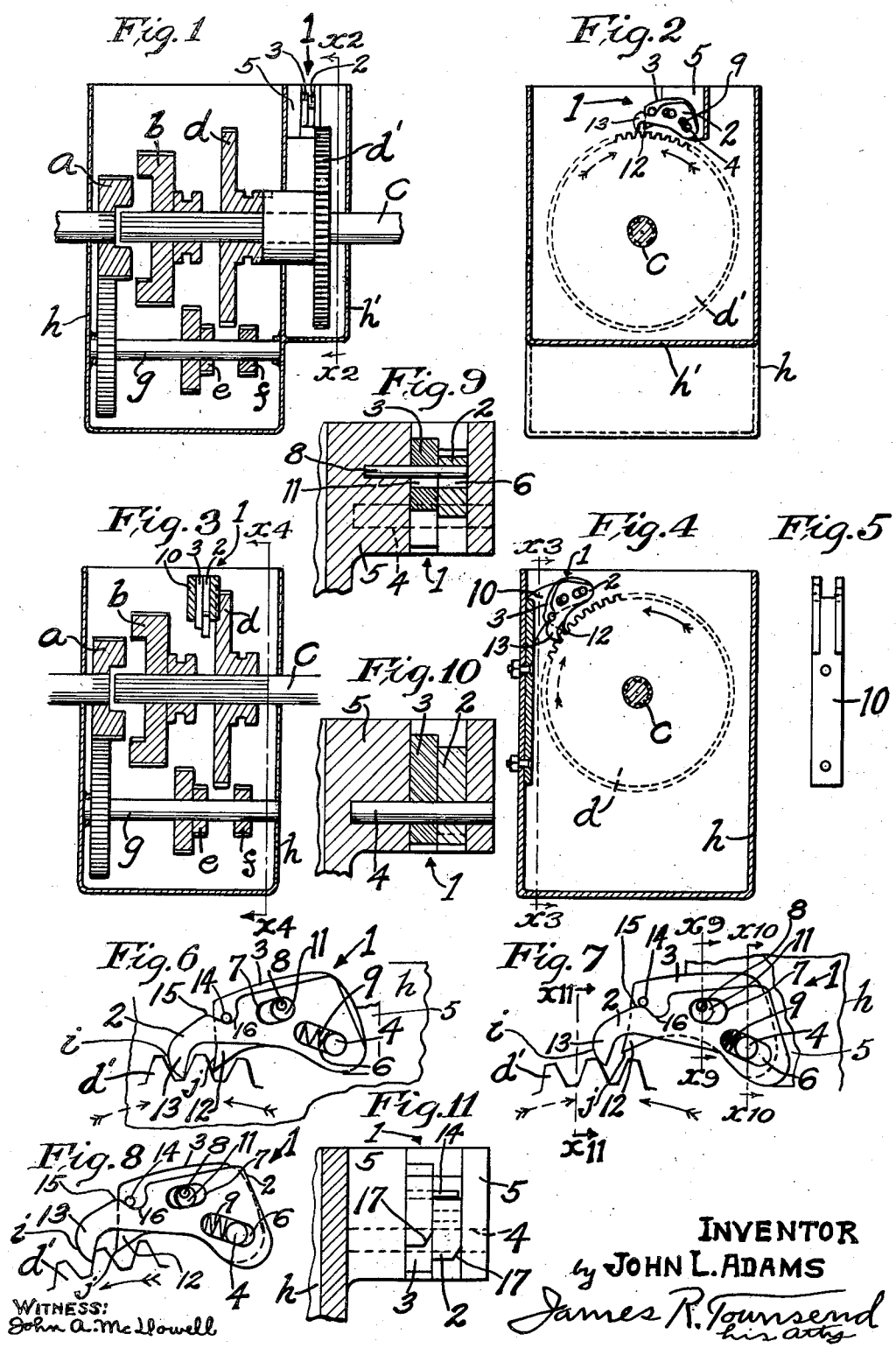

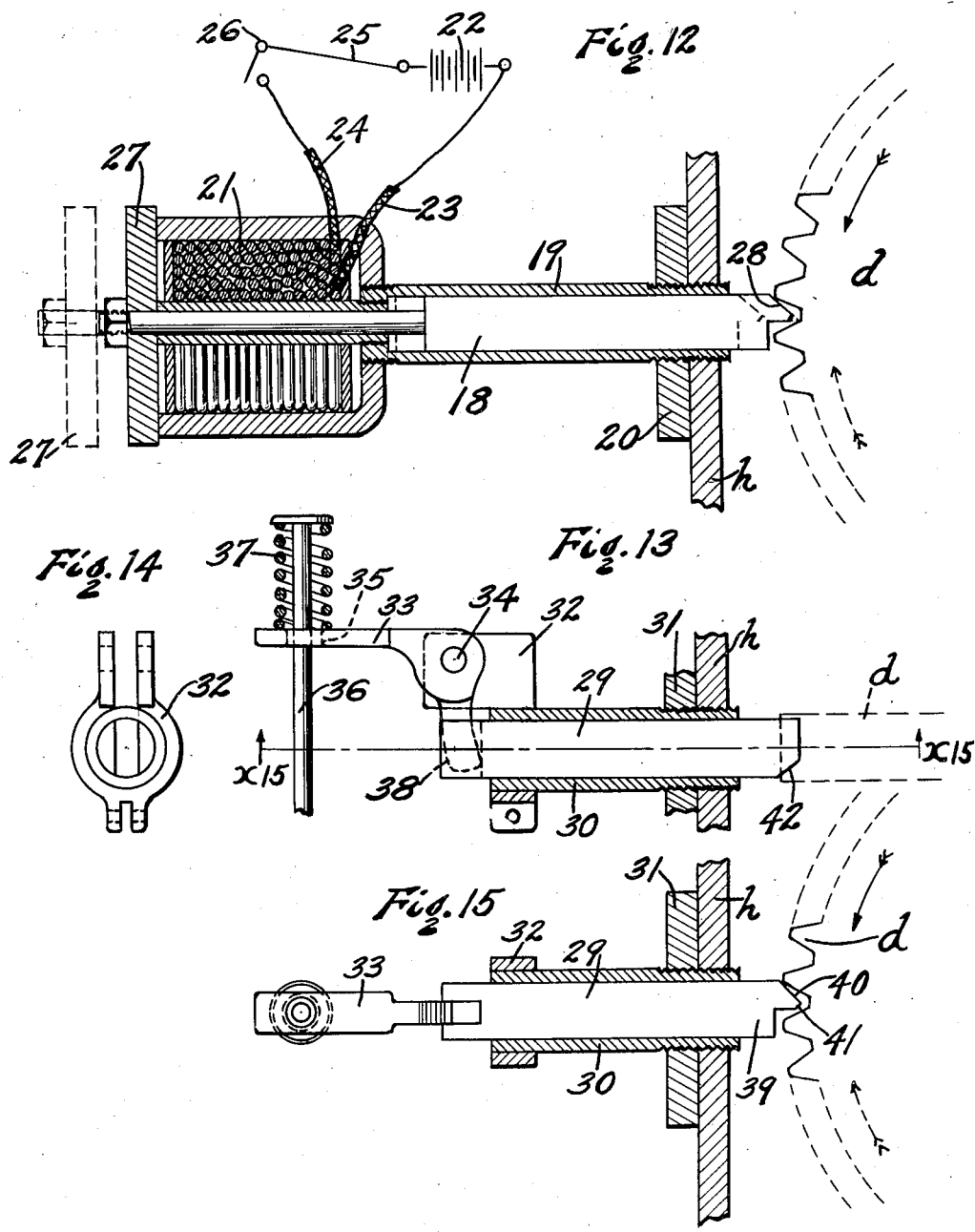

1,983,726

UNITED STATES PATENT OFFICE 1,983,726

ANTIBACKING ATTACHMENT FOR MOTOR VEHICLES

John L. Adams, Los Angeles, Calif.

Application December 8, 1930, Serial No. 500,857

11 Claims. (Cl. 192—4)

This invention relates to means for preventing a motor vehicle from starting backwards when the brakes are released for starting after the vehicle has been stopped on an up-grade.

The invention may be carried out in various forms and is applicable by additions to motor transmissions already built or may be embodied in transmissions supplied with the novel adjuncts applied in the course of factory construction.

A principle of this invention is that a stop is arranged to engage a shifting gear of the transmission when in certain positions or a gear or ratchet which may be placed on the driving shaft outside the transmission housing, to prevent back movement of the transmission when not in reverse position, and which permits forward movement of such shifting gear in all positions.

An object of the invention is to instantly snub the transmission to arrest backward movement after the transmission has been stopped, and yet avoid engagement of the snubber with moving parts when the transmission is being driven by the motor.

The invention includes the combination with a shiftable transmission of a dog adapted to engage teeth of the transmission gear and a guard operable by such teeth to hold the dog out of engagement with such teeth when the same are moving rapidly backward.

Other objects, advantages and features of invention may appear from the accompanying drawings, the subjoined detailed description and the appended claims.

The accompanying drawings illustrate the invention.

Figure 1 is a diagrammatic elevation partly in section of an automobile transmission and housing therefor, and one form of the invention applied as an attachment.

Fig. 2 is a section on line $x2$, Fig. 1, looking left in the direction of the arrow, showing the attachment gear and the automatic one-way stop dog upheld by the guard riding on top of the teeth of said gear.

Fig. 3 is a sectional elevation on line $x3$, Fig. 4, of the invention applied to the usual transmission already installed in the transmission housing, showing the stop in a different position.

Fig. 4 is a section on line $x4$, Fig. 3.

Fig. 5 is a detail elevation of the stop supporting bracket shown in Fig. 4.

Fig. 6 is an enlarged detail elevation of the stop showing the guard and dog in mesh with the gear, a fragment of which is shown.

Fig. 7 is a view analogous to Fig. 6, showing the stop released, in another position.

Fig. 8 is a view analogous to Fig. 7, showing the gear starting forward after the position shown in Fig. 7.

Fig. 9 is a section on line $x9$, Fig. 7.

Fig. 10 is a section on line $x10$, Fig. 7.

Fig. 11 is a detail of the bracket and stop and a fragment of the housing which is shown in section on a vertical plane indicated by line $x11$, Fig. 7.

Fig. 12 is a fragmental sectional elevation showing a form of stop operable by electro-magnetic means.

Fig. 13 is a fragmental plan view partly in section showing a brake attachment form of gear stop.

Fig. 14 is a face detail view of the lever bracket shown in Fig. 13, the lever being omitted.

Fig. 15 is a side elevation partly in section on line $x15$, Fig. 13, showing the stop in locked position.

Figs. 16, 17, 18 and 19 illustrate a further modification of the invention.

Fig. 16 is a side elevation partly in section showing in stopped position, said further modification as applied to a standard automobile transmission, fragments of which are shown.

Fig. 17 is an elevation partly in section on line $x17$, Fig. 16.

Fig. 18 is a plan view of such further modification in released position.

Fig. 19 is an end elevation of Fig. 16.

Fig. 20 is an enlarged fragmental detail view of another form of stop.

Fig. 21 is a fragmental section on line $x21$, Fig. 20.

Straight arrows on the section lines indicate the direction of sight.

In Figs. 1 to 11, I have shown one form of the automobile one-way stop.

In Figs. 1 and 2, I have indicated diagrammatically, parts of a standard automobile transmission in which $a$ is the driving pinion directly actuated by the motor, not shown; $b$ is a gear slidable on the broached drive shaft $c$ for shifting forward to high, and backward to intermediate drive. The shifting gear $d$ likewise slidable on the broached shaft $c$ for shifting into and out of mesh with gear $e$ for putting the transmission into and out of low gear and shifting it backwards into and out of mesh with gear $f$ on shaft $g$, for putting the transmission into and out of reverse, is shown in section.

Figs. 1 to 11 inclusive, show the preferred form of my invention in which $h$ indicates the standard housing enclosing the conventional type of transmission, and $h'$ an extension of such housing.

In Figs. 1 and 2, a companion shifting gear $d'$ is shown fixed to gear $d$ so that when gear $d$ is shifted into low gear, the gear $d'$ is shoved into alinement for engaging with the stop 1, and when thrown into neutral or reverse, the companion gear $d'$ is out of engaging position.

Referring to Figs. 1, 2, 6, 7 and 8 the stop 1 is mounted in the housing extension and comprises a guard 2 and a ratchet dog 3 fulcrumed by a pivot 4 to a bracket 5, fixed to the housing. Guard 2 is provided with slots 6 and 7 through which the pivot 4 and a stop pin 8 respectively extend. A recoil spring 9 in the slot 6 acts between the pivot pin and the end of the slot to push the guard in the direction of the forward motion of gear $d$.

The stop pin 8 solidly fits into bracket 10, and passes through a hole 11 of sufficient proportion in the dog 3 to allow the desired range of lost motion movement of guard 2 and dog 3 which will prevent the stop 1 from passing a predetermined position when not resting on companion gear $d'$.

Guard 2 is provided with a rounded nose or runner 13 designed to prevent the point 12 of dog 3 from engaging the teeth in the shifting gear $d'$ in case such gear should be thrown into contact with stop 1 while the car is moving rapidly backward, which might tend to injure the mechanism.

The guard 2 has a runner 13 rounded at front and back and of less width than the space between the teeth of the transmission as shown in Fig. 6, and the front face $i$ is normally spaced from the tip $j$ of the dog 3 so that when the runner is in the space between two teeth of the transmission, and the tip $j$ of the dog is in engagement with the rear of a transmission tooth, the front face $i$ of the runner is slightly spaced from the transmission of tooth.

While the backward motion of the gear $d'$ is fast enough so that the impact of the rear face of the teeth against runner 13 holds the guard 2 backward against the spring, dog 3 is held out of engagement with the teeth by the pin 14 resting on shoulder 15 of the guard.

When the motion of the gear slows down the weight of guard 2 or the spring 9 forces guard 2 forward so that the distance of the point 13 and tip $j$ of the dog 3 is widened and the groove 16 comes under pin 14 which allows point $j$ of dog 3 to drop into engagement with the rear face of a tooth of the gear.

The impingement of the teeth against runner 13 forces guard 2 upward and backward, in the direction of the moving teeth. As guard 2 moves upward, the pin 14 in dog 3 impinges against shoulder 15 of guard 2 which raises point 12 of dog 3 to such a position that it cannot engage any of the gear teeth as long as the latter are moving with sufficient speed to cause any shock should point 12 of dog 3 engage a tooth and stop the motion of gear $d'$.

However, when $d'$ stops, or the motion thereof becomes so slow that the impingement of the teeth against runner 13 is not sufficient to sustain the weight of guard 2 as in Figs. 3 and 4 or to overcome spring 9 in Figs. 1 and 2, the latter drops downward, or is moved in the direction of the forward motion of $d'$ by spring 9 as in Figs. 1 and 2, which both widens the space between 12 and 13, and moves pin 14 from support of shoulder 15 into the groove 16 as shown in Figs. 6 and 8, thus allowing point 12 of dog 3 to come into position with, or engage one of the gear teeth as shown in Fig. 6.

The transmission gears $d$ and $d'$ are then prevented from back motion until $d'$ is shifted from alinement with the stop 1.

Referring to Figs. 3 and 4 the said stop 1 is identically the same as described and shown in Figs. 1, 2, 6, 7 and 8 with the exception of where it is placed in position where its weight will carry it forward, thus disposing of recoil spring 9. In this construction the operation is the same as that described on page 2, paragraphs 7, 8, 9 and 10.

It will be understood that the successive impact of the gear teeth against runner 13 will not hold guard 2 rigidly in its full backward position against spring 9 or upward against its own weight, but as runner 13 passes over each tooth it moves forward to some extent but is met by the next succeeding tooth before reaching a position which allows dog 3 to drop into engaging position. As the motion of the teeth becomes slower runner 13 will allow dog 3 to drop lower and lower and when point $j$ of dog 3 begins to drop lower than the periphery of the teeth thus striking the rear face of said teeth it will at first glance off owing to the angle of the face of the tooth in rotation to the pin 4.

As the motion becomes slower point $j$ of dog 3 strikes low enough to engage the tooth. Runner 13 is forced backward against spring 9, or upward against its weight until the end of slot 6 strikes pin 4, at which time runner 13 is caused to disengage and move forward by the spring 9 or downward by its own weight. Slot 6 being of a length so that when by the time runner 13 is disengaged point $j$ of dog 3 does not have time to drop in front of the approaching tooth in time to engage until the motion of the tooth is slow enough to cause no shock.

The sides of guard 2 and dog 3 which are first contacted by $d$ or $d'$ when gear $d$ is shifted into low position, is beveled as at 17 to such degree that in case the end of a tooth of said gear strikes the bevel, the guard and dog are deflected upward so $d$ or $d'$ can slide into place under them.

Referring to Fig. 12, a bolt or bar 18 of suitable material slides loosely and freely in a way formed by a tube 19 threaded into the housing $h$ and secured there by lock nut 20.

A solenoid 21 is shown, taking current from a storage battery 22 connected by leads 23, 24 and 25 to a contact switch 26 which may be placed on the steering wheel, not shown, of the car, for the operator's convenience in operating the bolt 18.

When stopping on an up-grade, the driver closes the switch 26 which causes the solenoid 21 to draw armature 27 toward it and forces the bolt 18 into engagement with the teeth of gear $d$ as shown. When the car starts forward, bolt 18 is pushed back by teeth of gear $d$ impinging against the beveled end 28 of the bolt 18, which remains in neutral position until solenoid 21 is again energized.

In Figs. 13, 14 and 15, another form of construction is shown comprising a bar 29 of suitable material sliding freely in a tube 30 one end of which is threaded into the housing $h$ and locked thereto by a nut 31, the other end supporting a bracket 32 in which a lever 33 is fulcrumed as at 34. The lever 33 is provided with an opening 35 through which there extends a rod 36 that is secured at its other end to the foot brake mechanism, not shown, in such a manner that when the foot brake pedal is forced downward rod 36 will compress the spring 37 and cause the extension 38 of lever 33 to force bar 29 inward so that it is in position to contact and engage the teeth of gear $d$ when the latter is shifted into low position. The connection with the foot brake is such that sufficient compression of spring 37 is brought about to force 29 inward before the brakes take effect on the drums.

When the foot brake pedal is forced down until the brakes take effect, spring 37 is further compressed. As soon as the car is stopped, gear $d$ is shifted into low position and is immediately engaged by the inner portion 39 of the bar 29.

The foot brake may then be released and the engagement of gear $d$ by bar 29 prevents the car from moving backward. When the car is started forward, the teeth of gear $d$ impinging on the sloped portion 40 of bar 29 forces the latter outward out of contact with gear $d$.

To prevent bar 29 from engaging gear $d$ when the car has gained momentum backwards and thus endangering the mechanism, there is provided, a chamfered portion 41 on the inner portion 39 of bar 29, against which the impingement of the rapidly moving teeth will prevent any engagement. In case a tooth in gear $d$ should strike slidably against the inner end 39 when being shifted into low position, a bevel surface 42 is provided, so that a tooth striking it will force bar 29 outward and gear $d$ will slide freely into low position.

Referring to Figs. 16 to 19 inclusive, 43 is a gear placed on shaft $c$ outside the gear housing and independent of gear $d$. A bolt 44 is located in casing 45 and slides inwardly to mesh with the teeth of gear 43. A dog 46 riding in the teeth of gear 43 and having its upper end projecting through a lever 47 that is fulcrumed at 48 has its lower end projected into a slot 49 at the inner end of bolt 44.

When the car is moving forward, gear 43 is rotating forwardly as indicated by the arrow, and the dog 46 rides freely on the teeth of gear 43. When the car starts backward and the motion of gear 43 is reversed, dog 46 immediately engages the teeth of gear 43 and shifts 47 to slide bolt 44 into engagement with teeth of gear 43, and thus stops the backward motion of gear 43 and consequently of the car. As the car again starts forward, the impingement of the teeth of the gear 43 against the under sloping side 50 of bar 44 slides said bar back to its normal position of rest.

When gear $d$ is shifted into reverse position, it impinges against bar 51 and forces it outward causing lug 52 to raise dog 46 from contact with gear 43 and the car moves freely backward. In order that dog 46 may return to its position of contact with gear 43 when gear $d$ is again shifted out of reverse position, a compression spring 53 forces bar 51 inward, thus bringing lug 52 from under dog 46, and allowing the latter to again contact gear 43. A compression spring 46′ is provided to take up lost motion and to provide flexibility as shown in Fig. 17.

To keep dog 46 from contacting with the teeth of gear 43 in case gear $d$ is shifted from reverse to neutral or low position while the car is in motion backward, thus endangering the mechanism, a bolt 54 is suitably located at the rear of and attached to the gear housing by means of bearings 55.

A rod 56 is slidably connected at one end with bolt 54 and at its other end to the lower part of the foot brake lever 57 in such a manner that when the latter is forced into position for causing the brakes to take effect, rod 56 is forced backward so that its narrow portion allows bolt 54 to be forced inward by spring 58 so that the end 59 of bolt 54 engages in a slot 60 of said bar 51 thus holding dog 46 out of contact with gear 43 until the foot brake is released. When the foot brake is released, rod 56 moves forward so that the enlarged or widened portion 61 forces bolt 54 to disengage from bar 51 and compression spring 53 forces bar 51 inward, thus bringing lug 52 from under dog 46, and allowing the latter to again contact gear 43. At this time, the car will have ceased backward motion and there will not be any shocks upon the dog 46 and bolt 44 when it engages teeth of gear 43.

In Figs. 20 and 21, another form of construction of a stop is shown comprising a guard 62 and dog 63 fulcrumed by a pivot 64 to a bracket 65 fixed to the housing. Guard 62 is provided with a slot 66 which houses a recoil spring 67 that acts between the pivot pin and the end of said slot to push the guard 62 in the direction of the forward motion of gear 43. A small gear 68 mounted between the guard 62 and dog 63 meshes with the gear 43.

When the car starts backward and gear 68 begins to rotate in the reverse direction, gear 68 seeks its lowest position with the ends of its shaft 69 resting in the lower end of slot 70, and in this position the guard 62 and dog 63 are free to engage the teeth of the gear 43.

When the car starts forward and gear 68 resumes its normal movement in forward direction of the teeth of gear 43, the ends of its shaft 69 come to rest at the other or upper end of slot 70 in which position the guard 62 and dog 63 are raised clear of the teeth of the gear 43.

This form of construction may be applied to the position occupied by the dog 46 in Figs. 16 and 17, where the bar 51 and lug 52 would act in the slot 71 of the dog 63.

It is thus seen, I have provided in combination with a transmission gear, a ratcheted dog to prevent initial backward movement of the gear that is automatically retracted to allow forward movement of the transmission gear, and also to allow initially rapid backward movement, but will prevent initially slow backward movement of such gear wheel.

I claim:—

1. In a transmission having a shiftable transmission gear, stop means normally free from contact with the gear; said gear being shiftable by lateral movement, into alinement with such stop to prevent backward movement of the gear, and a guard to prevent the stop from engaging teeth of such gear when the same is moving rapidly backward.

2. In combination with a shifting gear wheel of an automobile transmission, a stop comprising a combination dog and a safety guard mounted out of alinement with the shifting transmission gear wheel when the same is in reverse transmitting position, and in position to engage with the gear when such gear is in low position.

3. In an automobile transmission, in combination with a shiftable transmission gear, a stop comprising a dog mounted to engage a tooth in the shifting gear when such gear is in low position and a guard operable by the teeth of the shifting gear to hold the dog from engaging position upon the rapid reverse movement of the transmission gear.

4. The combination with a transmission gear, of a dog to engage the rear face of a tooth of the transmission gear and a guard comprising a runner adapted to enter the space between two teeth of the transmission gear; the front of such runner being spaced from the engaging point of the tooth so that the front of the runner will not contact with the rear face of the tooth, but will drop freely to the bottom of the space between two teeth when in rest position.

5. The combination with a transmission gear, of a dog to engage the rear face of a tooth of the transmission gear, and a guard comprising a runner adapted to enter the space between two teeth of the transmission gear, the front of such runner being spaced from the engaging point of the tooth so that the front of the runner will not contact with the rear face of the tooth when at rest, but will allow the point of the dog to engage the rear of the following tooth to prevent backward movement of the transmission gear; said dog and guard having a lost motion connection by means of slots and pins to allow the guard to be raised upward and forward by the forward movement of the transmission gear, and upward and backward by the backward movement of the transmission gear.

6. The combination with a transmission gear, of a dog to engage a tooth of such gear upon reverse movement thereof, and a guard operable by backward movement of the gear to lift the dog out of position to engage the teeth of the gear when the said gear is in fast backward motion.

7. In an automobile transmission, the combination with a housing and a transmission gear, of a stop comprising a guard and a dog; a pivot supported by the housing; a guard fulcrumed on the pivot and provided with a slot through which the pivot extends; lost motion stop means to limit the movement of the guard, and means to yieldingly hold the guard from backward movement relative to the dog.

8. In an automobile transmission provided with a housing and with a transmission gear, a bracket fixed to the housing; a stop pin fixed to the bracket; a pivot pin fixed to the bracket; a dog pivoted on the pivot pin and having a hole to accommodate the stop pin with lost motion; a guard provided with slots in angular relation to each other, the pivot pin and stop pin extending through the slots; a spring in the pivot slot contacting the pivot and the end of the pivot slot to move the guard relative to the stop pin; the guard being provided with a runner to extend into the space between two teeth of the gear wheel; and the dog and runner being relatively movable and also movable relative to the gear wheel.

9. The combination with a toothed transmission gear wheel and a stop therefor; and a support, of a pivot fixed to the support and extending therefrom parallel to the axis of the wheel; a ratchet dog oscillatable on the pivot and provided with a detent adapted to engage the rear faces of the gear teeth, and also provided with a slanting rear face to ride over the gear teeth, and a hole above the detent; a detent lifting pin fixed to the dog; a guard having slots in angular relation to accommodate the pivot and the stop pin and slidably and oscillatably mounted on the dog and having an upper face provided with a notch and a hump for the operation of the dog; said guard being provided with a nose having rounded front and rear faces to ride over the gear teeth, and a spring to yieldingly move the guard to position in which the lifting pin is supported by the hump, and the nose can ride over the rear faces of the gear teeth, when the transmission wheel moves forward, and whereby on backward movement of the gear wheel at a high speed the gear teeth acting upon the rounding front face of the guard will throw the dog out of tooth engaging position until the speed of the gear wheel is slowed down to safely allow the dog to stop the gear wheel.

10. The combination with a shiftable transmission gear; of an automatic one way stop comprising a dog; a runner to prevent engagement of the dog with the gear teeth when the latter are in rapid backward motion and an auxiliary gear to hold the dog and guard out of contact with the gear when said gear is in normal forward motion.

11. In an automobile having a driving shaft; a gear on said shaft; a combined dog and a safety guard to prevent the dog from engaging the gear teeth while said teeth are in rapid backward motion.

JOHN L. ADAMS.